R. F. BEUTLICH.
BOTTLE WASHER.
APPLICATION FILED APR. 3, 1912.
1,125,048.
Patented Jan. 19, 1915.
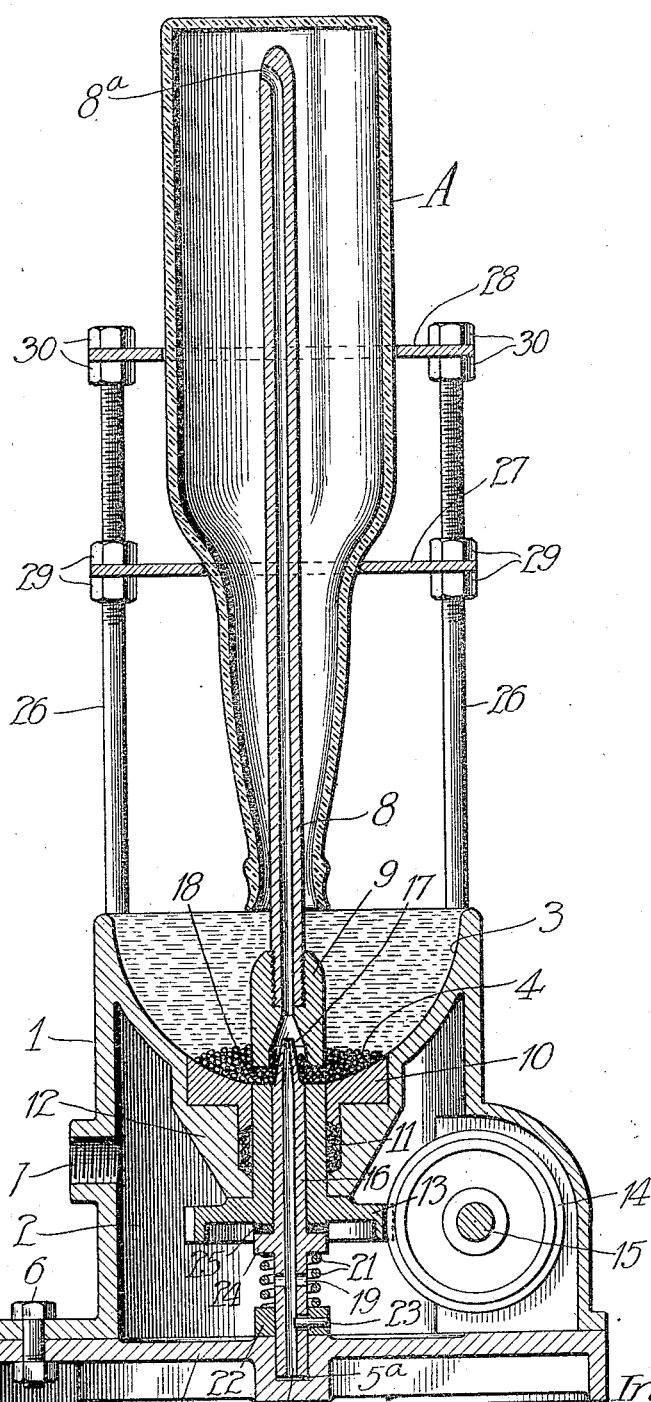

UNITED STATES PATENT OFFICE.

RICHARD F. BEUTLICH, OF CHICAGO, ILLINOIS, ASSIGNOR TO THE 20TH CENTURY MACHINERY COMPANY, OF CHICAGO, ILLINOIS, A CORPORATION OF ILLINOIS.

BOTTLE-WASHER.

1,125,048.

Specification of Letters Patent.

Patented Jan. 19, 1915.

Application filed April 3, 1912. Serial No. 688,182.

*To all whom it may concern:*

Be it known that I, RICHARD F. BEUTLICH, a citizen of the United States, residing at Chicago, in the county of Cook and State of Illinois, have invented certain new and useful Improvements in Bottle-Washers, of which the following is a specification.

My invention relates to bottle washers and to that particular type thereof adapted to clean the interior of bottles by means of shot or the like, and the object of my invention is to produce a simple and efficient device of this kind, particularly characterized by having the spindle which projects into the bottle made rotatable so that the shot may be projected against and caused to act upon all sides of the interior of the bottle. I also provide a novel and advantageous construction of casing which supports the rotatable spindle, and provides for the supplying of fluid under pressure, such as water, through the spindle and acting upon the shot, which is carried up through the spindle to the bottle.

While for the purposes of a clear and definite description of my invention and the principle thereof I have illustrated it in connection with a small stationary apparatus, yet it will be understood that the same mechanism and principle may be embodied in automatic machines in which a plurality of the mechanisms may be employed and in which such mechanisms may be made movable for automatic and rapid operations.

In the drawing the single figure is a central vertical sectional elevation of my apparatus illustrating a stationary bottle holder in which the bottle may be placed over the spindle by hand but it will be understood that the bottle may also be placed over the spindles in automatic manner by suitable mechanical devices.

Referring to the particular embodiment of my invention illustrated in the drawing, the casing 1 is provided with an interior chamber 2 and at its top with a bowl-shaped cavity 3 adapted to contain a sufficient quantity of shot indicated at 4. In the present instance the chamber 2 is closed by means of a bottom support or plate 5 secured to such casing in a fluid tight manner by means of bolts, one of which is shown at 6. The interior chamber of this casing is connected through the inlet opening 7 with any suitable source of fluid pressure, such as water under pressure.

The hollow spindle, although it might be made in one integral part, may be more conveniently formed as here shown in two separate portions or sections, the upper one 8 of which is the part that extends into the bottle and the lower section 9 of which extends through the bottom of the bowl and is supported within the casing. In the present instance the upper section is screw-threaded into the lower section. By preference the bottom of this bowl is formed as a removable piece 10 having a central opening acting as a part of the bearing of the spindle and below this removable portion is located suitable packing 11 to prevent the fluid under pressure from passing upwardly along the outside of the spindle. The recess for this packing is formed within a downward extension 12 from the bottom of the bowl and the same together with said removable portion 10 constitutes a long and substantial bearing for the spindle. The lower section of the spindle is provided with or is formed as a pinion 13 which is adapted to engage with a spiral drive gear 14 secured to a drive shaft 15 which is suitably journaled within the casing 1. Rotation of the gear 14 thus causes the spindle to rotate and consequently the upwardly and laterally directed discharge opening $8^a$ of the spindle is rotated and the shot discharged against all sides of the interior of the bottle which is indicated at A.

Within the lower section of the spindle is arranged the injector 16 terminating in a nozzle 17 at its upper end and at a point slightly above the radial openings 18 through the sides of the lower section of the spindle and forming communication between the bowl 3 and the bore of the spindle, with the result that when the injector is operating the shot will be drawn upwardly into the current of water under pressure and discharged together with the water at the upper end of the discharge outlet of the spindle. This injector has at its lower end one or more inlet openings 19 forming communication between the chamber 2 and the central longitudinal bore 20 of the injector. This injector is held spring pressed upwardly against the pinion 13 by means of a spring 21 bearing at one end against a collar 22 secured to the injector by means of a pin 23 and at the other end against a circular flange 24 which in turn presses against the circular gasket 25 interposed between such flange and the lower face of the pinion 13. As shown, the lower end of the injector bears in a circular socket 5ª in the base plate 5.

In the present instance I have illustrated a simple form of hand machine, it being understood that the bottle A is placed over the spindle and that such spindle does not have any longitudinal movement into and out of a bottle as would be the case in an automatic machine. Consequently I have herein shown a simple form of bottle holder comprising the fixed vertical posts 26 which may be mounted upon and secured at their lower ends to any convenient part of the casing, as the base plate 5, and which carry the two cross plates 27 and 28 provided with openings to accommodate the bottle. These plates are removable and also adjustable in vertical position in suitable manner as by means of the pair of nuts 29 and 30 coöperating with the upper screw-threaded portions of the post 26.

In operation the casing 1 is connected with a suitable source of fluid pressure, such as water under pressure, and the bowl is provided with a suitable quantity of shot. The water pressure is conveyed upwardly through the injector and the shot is drawn upwardly by the injector action and mingled therewith, with the result that such mingled shot and water under pressure are discharged forcibly against the sides of the interior of the bottle. By moving the bottle up and down with relation to the spindle, which is the reverse action as compared with the longitudinal movement of the spindle, all parts of the interior may be subjected to the direct impact of the shot, it being understood that during this described operation the drive shaft 15, which is driven in any suitable manner, causes the entire spindle to rotate.

The rotation of the spindle serves to keep the shot surrounding it in the lower part of the bowl in constant agitation, thus facilitating its passage into the radial orifices or openings 18 in the lower end of the spindle; and since the spindle is in constant motion the passage of the shot therethrough into the zone of action of the injector nozzle is assisted, and any tendency of the shot to clog in the opening or adjacent thereto is entirely prevented.

I claim:

1. In a machine of the class described, the combination, with a receptacle to contain shot and a hollow spindle extending through the bottom of the receptacle, of means for injecting suitable fluid under pressure through the spindle, and means for rotating the spindle during such operation, said hollow spindle having communication with said receptacle adjacent the bottom thereof.

2. In a machine of the class described, the combination of a bowl shaped receptacle adapted to contain water and shot, a hollow rotatable spindle extending upwardly through the bottom of the bowl and having openings providing communication between its interior and such bowl for the entrance of the shot, means for rotating the spindle, and means for supplying fluid under pressure to the interior of the spindle.

3. In a machine of the class described, the combination of a bowl shaped receptacle adapted to contain water and shot, a hollow rotatable spindle extending upwardly through the bottom of the bowl and having openings providing communication between its interior and such bowl for the entrance of the shot, means for rotating the spindle and an injector arranged in the inner end of said spindle for supplying fluid under pressure to the interior thereof.

4. In a machine of the class described, the combination, with a receptacle to contain shot, of a hollow spindle rotatably mounted therein, means for rotating such spindle, and means for supplying fluid under pressure to the spindle.

5. In a machine of the class described, the combination, with a receptacle to contain shot, of a hollow spindle rotatably mounted therein, means for rotating such spindle, and means for supplying fluid under pressure to the spindle, said spindle having its upper end adapted to extend into a bottle and being provided at its lower end with openings forming communication with said receptacle for the entrance of the shot into the interior of the spindle.

6. In a machine of the class described, the combination, with a receptacle to contain shot, of a hollow spindle rotatably mounted therein, said spindle comprising two sections, the upper one of which is adapted to extend into a bottle, and the lower one of which has openings forming communication with said receptacle for the entrance of the shot into the interior of the spindle and also has a pinion, and means for driving such pinion.

7. In a machine of the class described, the combination, with a receptacle to contain shot, of a hollow spindle rotatably mounted therein, means for rotating such spindle, and means for supplying fluid under pressure to the spindle, said latter means comprising an injector inserted into the hollow spindle.

8. In a machine of the class described, the combination of a casing having a chamber to which fluid under pressure is supplied and also having a bowl shaped cavity adapted to contain shot, a hollow rotatable spindle extending through such cavity and into said chamber with communications with both of them, and means for rotating the spindle.

9. In a machine of the class described, the combination of a casing having a chamber to which fluid under pressure is supplied and also having a bowl shaped cavity adapted to contain shot, a hollow rotatable spindle extending through such cavity and into said chamber with communications with both of them, and means located within said chamber for rotating the spindle.

10. In a machine of the class described, the combination of a casing having a chamber to which fluid under pressure is supplied and also having a bowl shaped cavity adapted to contain shot, a hollow rotatable spindle extending through such cavity and into said chamber with communications with both of them, and means located within said chamber for rotating the spindle comprising a pinion on the spindle and a driving gear journaled within the chamber and meshing with the pinion.

11. In a machine of the class described, the combination of a casing having a chamber to which fluid under pressure is supplied and also having a bowl shaped cavity adapted to contain shot, a hollow rotatable spindle extending through such cavity and into said chamber with communications with both of them, an injector arranged in said spindle and communicating with the chamber, and means for rotating the spindle.

12. In a machine of the class described, the combination of a casing having a chamber to which fluid under pressure is supplied and also having a bowl shaped cavity adapted to contain shot, a hollow rotatable spindle extending through such cavity and into said chamber with communications with both of them, an injector held in said spindle with a yielding pressure and communicating with the chamber, and means for rotating the spindle.

13. In a machine of the class described, the combination of a casing having a chamber to which fluid under pressure is supplied and also having a bowl shaped cavity adapted to contain shot, a hollow rotatable spindle extending through such cavity and into said chamber with communications with both of them, an injector arranged in said spindle and bearing at its lower end in the bottom of the chamber, said injector communicating with the chamber.

14. In a machine of the class described, the combination, with a receptacle to contain shot, of a hollow spindle rotatably mounted therein, means for rotating such spindle, and means for supplying fluid under pressure to the spindle comprising an injector held in said spindle with a yielding pressure.

RICHARD F. BEUTLICH.

Witnesses:
 MARTIN H. McGRATH,
 GEO. E. PHILLIPS.

Copies of this patent may be obtained for five cents each, by addressing the "Commissioner of Patents, Washington, D. C."